United States Patent [19]

Jackson

[11] Patent Number: 4,949,361
[45] Date of Patent: Aug. 14, 1990

[54] DIGITAL DATA TRANSFER SYNCHRONIZATION CIRCUIT AND METHOD

[75] Inventor: Ronald M. Jackson, Portland, Oreg.

[73] Assignee: Tektronix, Inc., Beaverton, Oreg.

[21] Appl. No.: 371,147

[22] Filed: Jun. 26, 1989

[51] Int. Cl.$^5$ ............................................. H04L 7/02
[52] U.S. Cl. .................................... 375/118; 307/271
[58] Field of Search ........................ 375/106, 118, 110;
370/102; 307/510, 518, 269, 271

[56] References Cited

U.S. PATENT DOCUMENTS

| | | | |
|---|---|---|---|
| 4,054,747 | 10/1977 | Pachynski, Jr. | 375/118 |
| 4,181,975 | 1/1980 | Jenkins | 307/518 |
| 4,270,183 | 5/1981 | Robinson et al. | 375/118 |
| 4,761,635 | 8/1988 | Arnaune et al. | 370/102 |
| 4,805,198 | 2/1989 | Stern et al. | 375/118 |
| 4,843,617 | 6/1989 | Marshall et al. | 375/118 |

*Primary Examiner*—Benedict V. Safourek
*Assistant Examiner*—Marianne Huseman
*Attorney, Agent, or Firm*—Boulden G. Griffith

[57] ABSTRACT

A data transfer synchronization method and circuit allows data to be transferred between two synchronous systems running asynchronously with each other in a way that does not require the receiving system clock to be running twice as fast as the source system clock. Data is clocked into a first set of flip-flops by the clock signal of the source system. The source system clock signal is also used to toggle a toggle flip-flop. The receiving system clock signal is used to clock a first clock bit flip-flop coupled to detect the state of the toggle flip-flop. A delayed version of the receiving system clock signal is used to clock the output of the first set of flip-flops into a second set of flip-flops. The normal (undelayed) receiving system clock signal is used to clock the output of the second set of flip-flops into a third set of flip-flops. A data valid signal is generated when the third set of flip-flops have on their outputs the data received during receiving system clock cycles in which the toggle flip-flop toggled. If the toggle flip-flop did not toggle during a particular receiving system clock cycle, no data valid signal is produced because this data is either redundant or uncertain due to insufficient guaranteed setup time.

16 Claims, 2 Drawing Sheets

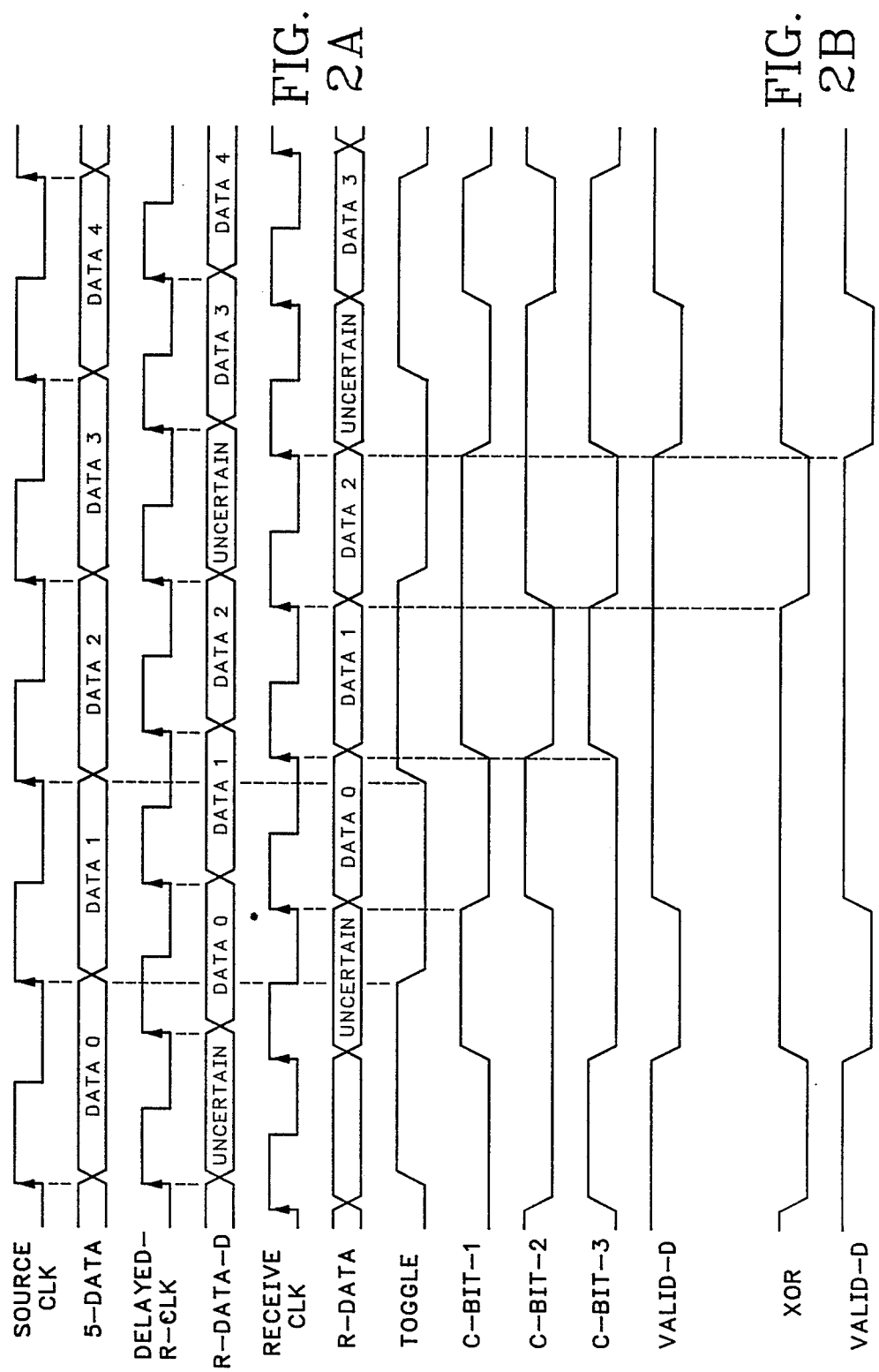

DIGITAL DATA TRANSFER SYNCHRONIZATION CIRCUIT AND METHOD

BACKGROUND OF THE INVENTION

This invention relates to the field of digital data transfer synchronization, and more particularly to the field of the acquisition of valid data from a target system by a logic analyzer or digital oscilloscope.

Many modern digital instruments, such as digital oscilloscopes and logic analyzers, use an internal periodic clock signal to sample and process data. In order to sample and process data whose validity is related to the occurrence of an external clock, such instruments must either use the external clock as the source of their internal clock or they must re-synchronize the external data to their internal clock. Using the external clock as the internal clock becomes problematical in high speed or complex systems. For example, if it is desired to keep track of the time of arrival of incoming data by associating a local time with it, called "timestamping" the data, doing so exactly becomes very difficult when an external clock signal is used as the internal clock.

Re-synchronizing the incoming data to an internal clock permits less expensive and more reliable designs, but this approach previously required that the external clock frequency be half or less than half of the internal clock frequency What is desired is a way of reliably capturing data from an external synchronous system that is running almost as fast as the acquiring system and effectively re-synchronizing that incoming data to an internal clock.

SUMMARY OF THE INVENTION

The present invention is a circuit and corresponding method that permits the synchronized acquisition of data associated with an external clock that is running at speeds approaching that of the internal clock.

Data is clocked into a first set of data flip-flops by the clock of the source system. The source system clock signal is also used to cause a toggle flip-flop to toggle The state of the toggle flip-flop is detected and stored in a first clock bit flip-flop using the receiving system clock. A delayed version of the receiving system clock signal is used to clock the output of the first set of data flip-flops into a second set of data flip-flops. The normal (undelayed) receiving system clock signal is used to clock the output of the second set of data flip-flops into a third set of data flip-flops.

The state of the first clock bit flip-flop is shifted to second and third clock bit flip-flops and both of the outputs of these flip-flops are monitored by an exclusive OR gate (XOR), which generates a data valid signal when the third set of data flip-flops have on their outputs data which was received during receiving system clock cycles in which the toggle flip-flop toggled. If the toggle flip-flop did not toggle during a particular receiving system clock cycle, no data valid signal is produced because this data is either redundant or erroneous due to insufficient guaranteed setup time.

In an alternative arrangement of the circuitry for generating the data valid signal, the XOR gate monitors the first and second clock bit flip-flops, and the third flip-flop is used instead as a data valid flip-flop to track the output of the XOR gate and generate the data valid signal.

BRIEF DESCRIPTION OF THE DRAWINGS

FIG. 2A is a timing diagram illustrating the operation of the circuit shown in FIG. 1.

FIG. 2B is a timing diagram illustrating the operation of the alternative arrangement of the circuit shown in FIGS. 1A and 1B.

DETAILED DESCRIPTION

Figure 1A:
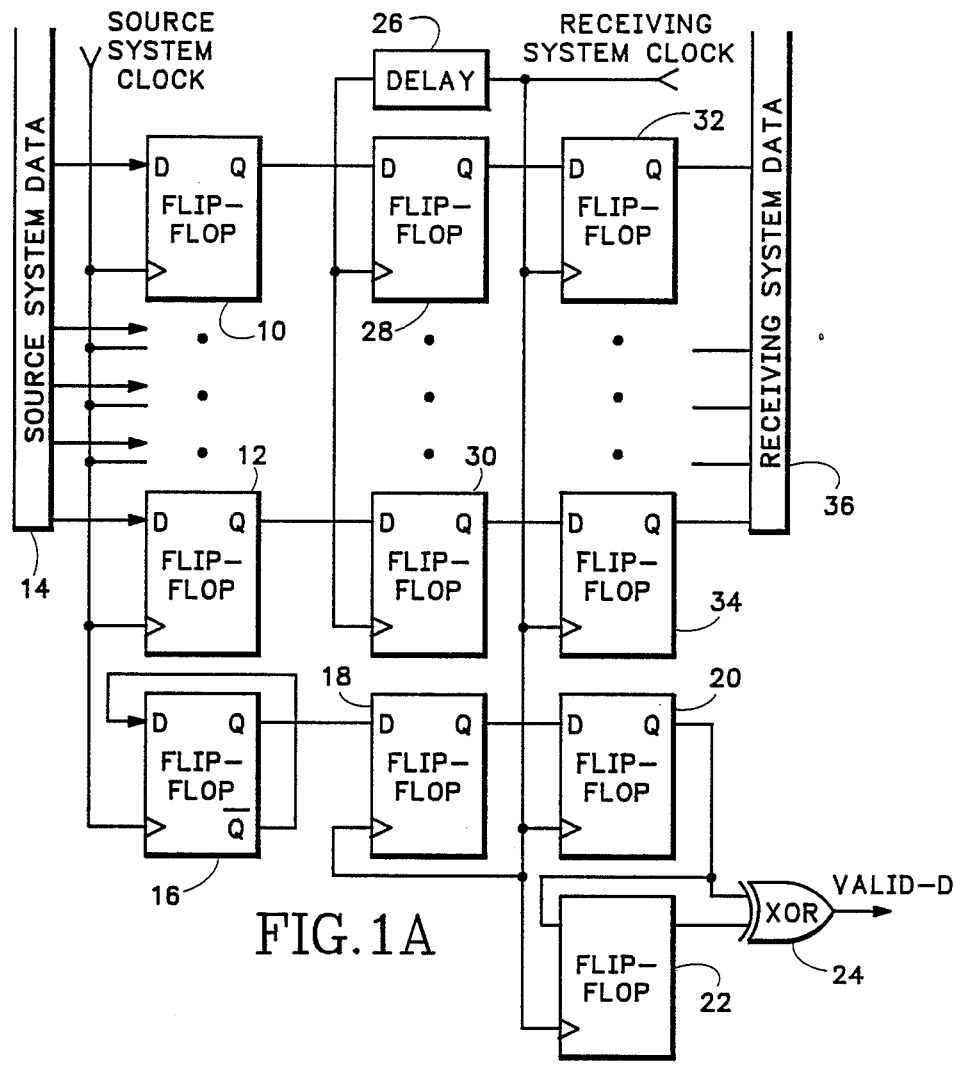
FIG. 1A is a schematic diagram of the circuit of the present invention.

Referring to FIG. 1A, a first set of data flip-flops 10-12 receive source system data from the source system data bus 14 and are clocked by the source system clock signal. The source system clock signal is also used to make another flip-flop 16 toggle. This toggle flip-flop 16 toggles on every occurrence of the source system clock signal because its Q-not (inverted) output is connected to its input. The output of the toggling flip-flop 16 is clocked into a first clock bit flip-flop 18 by the receiving system clock signal.

The output of the first clock bit flip-flop 18 is shifted through a second clock bit flip-flop 20 and a third clock bit flip-flop 22 that are also both clocked by the receiving system clock signal. Exclusive OR gate (XOR) 24 is connected to the outputs of the second and third clock bit flip-flops 20,22 to produce a high VALID-Data output as long as the contents of these two flip-flops are not equal.

Figure 1B:
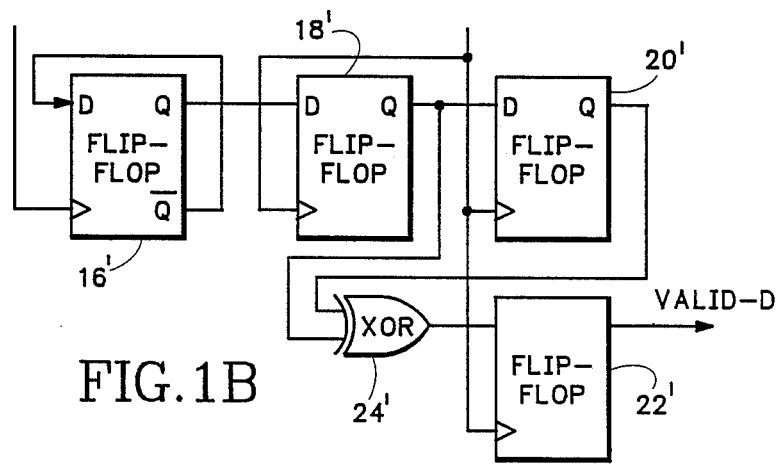
FIG. 1B is a schematic diagram of an alternative arrangement of a portion of the circuitry in FIG. 1A.

In the alternative arrangement shown in FIG. 1B, the exclusive OR gate (XOR) 24, directly monitors the output of the first and second clock bit flip-flops 18' and 20' and produces a high output as long as the contents of these two flip-flops are not equal. The output of the the XOR gate 24, is tracked one receiving system clock pulse later by the output of data valid flip-flop 22, (which was called the third clock bit flip-flop in the first arrangement).

Delay element 26 is used to produce a delayed version of the receiving system clock signal. This delayed receiving system clock signal is used to clock the output of the first set of data flip-flops 10-12 into a second set of data flip-flops 28-30. The normal (undelayed) version of the receiving system clock is used to clock the data from second set of data flip-flops 28-30 to a third set of data flip-flops 32-34. Data from this third set of data flip-flops 32-34 is available for further synchronous activity over the receiving system's data bus 36.

Referring now to FIG. 2A, in conjunction with FIG. 1A, the source system clock, shown on the first line, is running at a frequency that is approximately three quarters of the receiving system clock, shown on the fifth line. The delayed version of the receiving system clock, DELAYED-R-CLK, is shown on the third line of FIG. 2A. S-DATA on the second line of FIG. 2A is data from the source system, the data currently in the first set of data flip-flops 10-12 of FIG. 1A. It can be seen that this data is changing on the rising edge of the source system clock signal, SOURCE CLK, shown on the first line of FIG. 2A.

R-DATA-D is the data in the second set of data flip-flops 28-30 of FIG. 1A. This data is clocked by the rising edge of the delayed version of the receiving system clock signal, DELAYED-R-CLK, shown on the third line of FIG. 2A. Note that the data "DATA 0" in S-DATA, the first set of data flip-flops 10-12, is transferred to the second set of data flip-flops 28-30 by the next occurrence of the rising edge of DELAYED-R-CLK, so that "DATA 0" appears in R-DATA-D shortly after this edge. (Ignore for now the UNCERTAIN data in R-DATA-D; its significance will be fully discussed below.)

R-DATA is the data in the third set of data flip-flops 32-34 in FIG. 1A. This data is clocked in by the normal (undelayed) receiving system clock signal RECEIVE CLK. Note the arrival of "DATA 0" in R-DATA immediately following the third rising edge of RECEIVE CLK. The data in R-DATA (data flip-flops 32-34) is now synchronized with the receiving system clock signal and therefore not vulnerable to metastability. It is now available in this synchronized form for further distribution within the receiving system. However, it remains to identify which of this data is valid and which is redundant or of uncertain quality.

In the example shown in FIG. 2A, the frequency of the source system clock signal and the frequency of the receiving system clock signals are in approximately the ratio of 3:4. Consequently, every fourth time that the receiving system clock occurs, the data will not have changed since the last time. Moreover, as is shown in this example, sometimes the active edge of the delayed version of the receiving system clock signal that is clocking this data in will be occurring in close temporal proximity to the occurrence of the active edge of the source system clock. When this occurs, the data in the first set of flip-flops 10-12 may be unstable at the time that the active edge of the delayed receiving system clock signal appears, causing "UNCERTAIN" data to clocked into the second set of flip-flops 28-30. In either event, the receiving system must have some way of knowing which data is uncertain or redundant and which is valid. The VALID-Data signal at the bottom of FIG. 2A (and 2B) provides this information.

The signal TOGGLE is the output of the toggle flip-flop 16. The C-BIT-1 signal is the output of the first clock bit flip-flop 18. It represents the TOGGLE signal as it is sampled on the active edges of the normal (undelayed) receiving system clock signal RECEIVE CLK. Note what happens at the time of the fifth rising edge of the RECEIVE CLK signal: C-BIT-1 does not change state. This is because TOGGLE has not toggled since the time of the last active edge of RECEIVE CLK. At the time of each of the three preceding occurrences of RECEIVE CLK, TOGGLE had been in a state that was different from its earlier state.

The information inherent in the failure of TOGGLE to toggle during a particular cycle of the receiving system clock is detected by the first clock bit flip-flop 18, whose output is C-BIT-1, and forwarded through the short shift register consisting of the second and third clock bit flip-flops 20 and 22 whose outputs are C-BIT-2 and C-BIT-3. Both of these signals are monitored by the XOR gate 24, which produces a low output when R-DATA, the data output from the third set of data flip-flops 32-34, is uncertain. Note how the extended high signal on C-BIT-1, indicating that TOGGLE did not toggle, propagates through C-BIT-2 and C-BIT-3 and is detected by the XOR gate 24 to produce a low pulse on VALID-D. Transit through the short shift register has time aligned the low pulse on VALID-D with the uncertain data on R-DATA. There is, however, a delay between the availability of R-DATA and VALID-D that arises from the extra gate delay time of the XOR gate 24. This time is small and is not accurately represented in FIG. 2A.

The second clock bit flip-flop 20 is also serving the function of preventing any metastability that may occur in the first clock bit flip-flop 18 from propagating any further. The first clock bit flip-flop 18 has potential metastability problems, since the timing relationship between the transitions in the TOGGLE data on its input and the arrival of the receiving system clock that it runs off of is an asynchronous one. However, since there will be a full receiving system clock signal period before the output of the first clock bit flip-flop 18 is examined by the second clock bit flip-flop 20, any metastability will have had ample time to resolve itself by then. Thus, if the third clock bit flip-flop 22 were eliminated and the XOR gate 24 were connected to examine the contents of the first and second clock bit flip-flop's instead of the second and third ones as shown, the metastability of the first clock bit flip-flops output would affect the quality of the VALID-D signal. This could, perhaps, be tolerated in some systems, but has been successfully avoided in this one by the use of the third clock bit flip-flop 22.

In the alternative arrangement of the VALID-D circuitry shown in FIG. 1B, the gate delay time of the XOR gate 24 described above for FIG. 1A and 2A is eliminated. In this arrangement, the XOR gate 24' directly monitors C-BIT-1 and C-BIT-2. The output of the XOR gate 24,, shown in FIG. 2A as XOR, is tracked by the valid data flip-flop 22, to produce a low output on VALID-D almost exactly at the time that the uncertain or redundant data becomes the data present on R-DATA. Again, note how the extended high signal on C-BIT-1, indicating that TOGGLE did not toggle, propagates through C-BIT-2 and is detected by the XOR gate 24'. The resulting low pulse on the XOR output is tracked one receiving system clock pulse later by the output of the valid data flip-flop 22,, VALID-D. While this arrangement of the circuitry eliminates the gate delay of the XOR gate 24', it is believed to be less robust in its resistance to metastability and the arrangement shown in FIG. 1A is the preferred embodiment.

The delay 26 operates to separate in time the receipt of the data being transferred from the receipt of the information regarding the occurrence of the source system clock. With these two times separated by a small but sufficient constant interval, if the source clock has occurred since the last occurrence of the receiving system clock signal, the toggle flip-flop 16 will have changed state and new data is present that has had sufficient time to satisfy the setup time requirements of the receiving flip-flops 28-30. Conversely, if the receiving system does not detect a change in TOGGLE, the source system clock signal has not occurred in the intervening interval and the associated data is either old and redundant, or is brand new and has not been given adequate setup time to assure validity. In either of these events, this data should be discarded as invalid.

It is not important how the Delay 26 is achieved, but it is important to calculate this time properly. For this circuit to function properly, the amount of time delay generated by the delay element 26 must be at least as long as the sum of the following two quantities: (1) the maximum expected skew between the outputs of any of the first set of data flip flops 10-12 and the output of the toggle flip-flop 16; and (2) the cumulative width of the *actual* setup and hold window of the second set of data flip-flops 28-30 and the first clock bit flip-flop 18. Taken together, these two quantities define the minimum time required to ensure that if a toggle is detected on the clock path, the associated data has actually satisfied the setup requirements of the data path. To minimize this time, it desirable to have the smallest possible setup and hold time window across these flip-flops (28–30 and 18). The actual location in time of this window is not important, but it is important that the windows of the individual flip-flops involved be well aligned with each other, so that their sum is minimized. This is most easily accomplished by using flip-flops that have been fabricated together on the same die.

With this delay properly chosen, if the receiving system has any chance of detecting a source system clock transition at the first clock bit flip-flop 18, then the data at the input to the second set of flip-flops 28–30 has been stable for at least the actual setup time of those flip-flops. On the other hand, if it fails to detect a source system clock transition at the first clock bit flip-flop 18, then the data at the input to the second set of flip-flops 28–30 may be redundant, unstable, or not stable long enough to satisfy the setup requirements of these flip-flops, but in any event it will be correctly identified as not being valid new data. In this case, the data will be acquired when it is valid on the next receiving system clock signal active edge.

While the delay must be long enough to satisfy the above criteria, it should be no longer than necessary, since the longer this delay is, the slower the source system clock must be in relation to the receiving system clock. The minimum period of the source system clock for correct operation is the sum of the period of the receiving system clock signal plus the receiving clock delay interval calculated above. For instance, if the receiving system clock rate is 200 MHz, implying a period of 5 ns, and the delay value has to be 1 ns to allow for output skew in flip-flops 10–12 and 16 and to provide adequate actual setup and hold time windows for flip-flops 28–30, then the period of the source system clock must be at least 6.0 ns. The maximum usable source system clock frequency is then the reciprocal of 6 ns, or about 167 MHz. Attempted operation above this frequency will soon lead to mis-identification of valid and invalid data. Additional circuitry could be employed to detect violations of this condition.

The invention as described above can be simplified to some extent if certain limitations on its operation can be tolerated. In particular, the third set of data flip-flops 32–34 could be eliminated, if the potential for metastability in the output of the second set of flip-flops would not cause a problem for the receiving system. Similarly, the valid data flip-flop 22, in the arrangement shown in FIG. 1B could be eliminated and the output of the XOR gate 24' used directly. Again, though, this would allow the potential for metastability in the output of the first clock bit flip-flop 18 to propagate through the VALID-D signal. And of course, eliminating either of these flip-flops, without also eliminating the other, would lead to the VALID-D signal being one full cycle out of step with the data. Any of these limitations, however, might be acceptable if the particular circuitry immediately downstream of this receiving system were sufficiently tolerant of them.

Thus far throughout this text, only flip-flops have been mentioned as the data storage elements. However, any functional equivalent of a flip-flop, that is, any circuit or device capable of storing a bit of digital data synchronously with the occurrence of a system clock edge can be substituted for the flip-flops in the foregoing discussion.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

I claim:

1. A circuit for synchronizing digital data transfer between a source system having source system data synchronized to a source system clock signal and a receiving system having receiving system data synchronized to a receiving system clock signal, the circuit comprising:
   a first data storage element, clocked by the source system clock signal and coupled to receive source system data;
   a second data storage element, coupled to receive the source system clock signal in such a manner that the output toggles on the occurrence of the source system clock signal;
   a third data storage element, clocked by the receiving system clock signal and coupled to detect the output of the second data storage element;
   means for delaying a signal, having the receiving system clock signal as input and a delayed receiving system clock signal as output;
   a fourth data storage element, clocked by the delayed receiving system clock signal and coupled to receive the output of the first data storage element, for producing an output synchronized to the delayed receiving system clock signal; and
   means for generating a data valid signal, clocked by the receiving system clock signal and coupled to receive the output of the third data storage element, so that a data valid signal output is generated during every receiving system clock signal cycle that follows a receiving system clock signal cycle in which the state of the output of the third data storage element has changed.

2. A circuit as recited in claim 1 wherein the generating means comprises:
   a fifth data storage element, clocked by the receiving system clock signal and coupled to receive the output of the third data storage element; and
   an XOR gate, having the output of the third and fifth data storage elements as its inputs, to produce a data valid signal during every receiving system clock signal cycle that the contents of the third and fifth data storage elements are not equal.

3. A circuit as recited in claim 2 wherein the generating means further comprises a sixth data storage element coupled to receive the output of the XOR gate, for producing the data valid signal one receiving system clock signal cycle later.

4. A circuit as recited in claim 3 further comprising a seventh data storage element, clocked by the receiving system clock signal and coupled to receive the output of the fourth data storage element.

5. A circuit as recited in claim 2 comprising a seventh data storage element, clocked by the receiving system clock signal and coupled to receive the output of the fourth data storage element.

6. A circuit as recited in claim 1 wherein the generating means comprises:

a fifth data storage element, clocked by the receiving system clock signal and coupled to receive the output of the third data storage element;

a sixth data storage element, clocked by the receiving system clock signal and coupled to receive the output of the fifth data storage element; and an XOR gate, having the outputs of the fifth and sixth data storage elements as inputs, to produce a data valid signal during every receiving system clock signal cycle that the contents of the fifth and sixth data storage elements are not equal.

7. A circuit as recited in claim 6 further comprising a seventh data storage element, clocked by the receiving system clock signal and coupled to receive the output of the fourth data storage element.

8. A circuit as recited in claim 1 further comprising a seventh data storage element, clocked by the receiving system clock signal and coupled to receive the output of the fourth data storage element.

9. A method for synchronizing digital data transfer between a source system having source system data synchronized to a source system clock signal and a receiving system having receiving system data synchronized to a receiving system clock signal, the method comprising the steps of:

clocking the source system data into a first data storage element using the source system clock signal;

toggling a second data storage element using the source system clock signal;

detecting the condition of the second data storage element with a third data storage element clocked by the receiving system clock signal;

delaying the receiving system clock signal to produce a delayed receiving system clock signal;

clocking the output of the first data storage element into a fourth data storage element using the delayed receiving system clock signal; and generating a data valid signal during those cycles of the receiving system clock signal that follow cycles in which the output of the third data storage element has changed.

10. A method as recited in claim 9 wherein the generating step comprises the steps of:

clocking the output of the third data storage element into a fifth data storage element using the receiving system clock signal; and producing a data valid signal during those cycles of the receiving system clock signal that the contents of the fifth data storage element and the third data storage element are not equal.

11. A method as recited in claim 10 wherein the generating step further comprises the step of clocking the data valid signal into a sixth data storage element using the receiving system clock signal to produce another data valid signal delayed by one receiving system clock signal period.

12. A method as recited in claim 11 further comprising the step of clocking the output of the fourth data storage element into a seventh data storage element using the receiving system clock signal.

13. A method as recited in claim 10 further comprising the step of clocking the output of the fourth data storage element into a seventh data storage element using the receiving system clock signal.

14. A method as recited in claim 9 wherein the generating step further comprises the steps of:

clocking the output of the third data storage element into a fifth data storage element using the receiving system clock signal;

clocking the output of the fifth data storage element into a sixth data storage element using the receiving system clock signal; and producing a data valid signal during those cycles of the receiving system clock signal that the contents of the fifth and sixth data storage elements are not equal.

15. A method as recited in claim 14 further comprising the step of clocking the output of the fourth data storage element into a seventh data storage element using the receiving system clock signal.

16. A method as recited in claim 9 further comprising the step of clocking the output of the fourth data storage element into a seventh data storage element using the receiving system clock signal.

* * * * *